United States Patent
Wang et al.

(10) Patent No.: US 7,675,578 B2
(45) Date of Patent: Mar. 9, 2010

(54) TELEVISION AND BACK LIGHTING SOURCE MODULE CAPABLE OF PREVENTING HARMONIC INTERFERENCE

(75) Inventors: Jui-Ming Wang, Chung Ho (TW); Bomin Weng, Chung Ho (TW)

(73) Assignee: Amtran Technology Co., Ltd. (TW)

( * ) Notice: Subject to any disclaimer, the term of this patent is extended or adjusted under 35 U.S.C. 154(b) by 843 days.

(21) Appl. No.: 11/350,569

(22) Filed: Feb. 9, 2006

(65) Prior Publication Data

US 2006/0187363 A1    Aug. 24, 2006

(30) Foreign Application Priority Data

Feb. 24, 2005    (TW) ............................ 94105573 A

(51) Int. Cl.
*H04N 9/31* (2006.01)
*H05B 37/02* (2006.01)

(52) U.S. Cl. ................................. 348/739; 315/209 R

(58) Field of Classification Search ................ 348/739, 348/744, 746, 751, 742, 607–608, 618, 611; 315/209, 370; 345/102
See application file for complete search history.

(56) References Cited

U.S. PATENT DOCUMENTS

| | | | | |
|---|---|---|---|---|
| 5,796,213 A | * | 8/1998 | Kawasaki | 315/209 R |
| 5,844,540 A | * | 12/1998 | Terasaki | 345/102 |
| 6,037,925 A | * | 3/2000 | Kim | 345/99 |
| 6,118,221 A | | 9/2000 | Kumasaka et al. | |
| 6,667,588 B1 | * | 12/2003 | van den Herik | 315/370 |
| 2004/0217715 A1 | * | 11/2004 | Yang et al. | 315/209 R |
| 2006/0044297 A1 | * | 3/2006 | Furukawa et al. | 345/204 |
| 2007/0126757 A1 | * | 6/2007 | Itoh et al. | 345/690 |
| 2008/0074561 A1 | * | 3/2008 | Arai et al. | 348/744 |

FOREIGN PATENT DOCUMENTS

TW    402858    8/2000

OTHER PUBLICATIONS

Search report dated Jan. 12, 2007 in related Taiwanese Patent Application No. 094105573.

* cited by examiner

*Primary Examiner*—Paulos M Natnael
(74) *Attorney, Agent, or Firm*—Ostrolenk Faber LLP

(57) ABSTRACT

A television includes a light source, a pulse-width-modulation (PWM) controller, and a control component. The PWM is coupled electrically to the light source, and is operable so as to generate a source control signal for controlling turning on and turning off of the light source. The control component is coupled to the PWM controller for controlling frequency of the source control signal outputted by the PWM controller. The control component has a plurality of control states that correspond to distinct display scanning frequencies of television standards, respectively. Setting of the control component in a selected one of the control states results in control of the frequency of the source control signal outputted by the PWM controller such that the frequency of the source control signal is not an integer multiple of the distinct display scanning frequency that corresponds to the selected one of the control states.

11 Claims, 2 Drawing Sheets

TELEVISION AND BACK LIGHTING SOURCE MODULE CAPABLE OF PREVENTING HARMONIC INTERFERENCE

CROSS-REFERENCE TO RELATED APPLICATION

This application claims priority of Taiwanese application no. 094105573, filed on Feb. 24, 2005.

BACKGROUND OF THE INVENTION

1. Field of the Invention

This invention relates to a television and its back lighting source module, more particularly to a television and a back lighting source module capable of preventing harmonic interference.

2. Description of the Related Art

Flat Panel Display (FPD) devices, which are used as liquid crystal televisions, plasma televisions, etc., are advantageous over conventional Cathode Ray Tube (CRT) devices in that they generate less radiation and are thinner, lighter, and more environmental friendly. Therefore, it has become a current trend to replace conventional CRT televisions with FPD televisions.

A conventional LCD television includes a display panel and a back lighting source module. The display panel includes components, such as conductive glass, liquid crystals, orientation films, color filters, polarizers, drive control elements, etc. The back lighting source module includes components, such as a light source (i.e., cold cathode lamps or light emitting diodes), a light guide plate, various optical films, etc. Moreover, an inverter enables the back lighting source module to generate a source control signal for controlling turning on and turning off of the light source.

As shown in FIG. 1, adjustment of brightness and contrast in an LCD TV is generally realized through adjustment of the amplitude (a) of a power signal 101 applied to the light source. In actual measurements, adjustment of the amplitude (a) between maximum and minimum values only results in a narrow range of adjustable brightness values, i.e., between 250 cd/m$^2$ and 180 cd/m$^2$, for the LCD TV.

Referring to FIG. 2, an LCD TV capable of operating in a burst mode is shown to include a light source control unit 3 and a set of light sources 34 (such as lamp tubes). The light source control unit 3 includes a power circuit 30, a control unit 31, a transformer unit 32, and a feedback unit 33.

Unlike the control scheme of FIG. 1, when the amplitude of the power signal is adjusted to the minimum value, the control unit 31 operates in a burst mode, where the control unit 31 receives a width-adjustable square-wave signal 301 and sends out a source control signal 201 to control the light sources 34 through the transformer unit 32 and the feedback unit 33 according to the square-wave signal 301.

In the burst mode, power to the light sources 34 is interrupted intermittently according to the square-wave signal 301. As shown in FIG. 3, the time duration (D) of the source control signal 201 from the control unit 31 in which the light sources 34 are turned on and turned off continuously is so controlled to cause persistence of vision such that a visual lowest brightness output of the light sources 34 is obtained, whereas the time duration (d) corresponds to the turn-off period of the light sources 34. By adjusting the length of the duration (d) to the duration (D), a wider range of adjustable brightness values, for example, between 250 cd/m$^2$ and 50 cd/m$^2$, is achieved.

However, during the process of adjusting the source control signal 201, if the resulting turn-on/turn-off frequency of the light sources 34 happens to be an integer multiple of a display scanning frequency, this arises in harmonic interference, which will result in a mura phenomenon on the screen of the LCD TV, thereby affecting adversely the quality of images presented by the LCD TV. A similar mura phenomenon also happens in back-projection televisions and LCD projector devices.

SUMMARY OF THE INVENTION

Therefore, the present invention provides a television and a back lighting source module capable of preventing harmonic interference and having better brightness and contrast.

The present invention also provides a television and a back lighting source module capable of preventing harmonic interference so as to overcome the aforesaid mura phenomenon associated with the prior art.

According to one aspect of the present invention, there is provided a television adapted for receiving a television image signal having a display scanning frequency and for presenting an image corresponding to the television image signal. The television comprises a light source, a pulse-width-modulation controller, and a control component.

The pulse-width-modulation controller is coupled electrically to the light source, and is operable so as to generate a source control signal for controlling turning on and turning off of the light source.

The control component is coupled to the pulse-width-modulation controller for controlling frequency of the source control signal outputted by the pulse-width-modulation controller. Moreover, the control component has a plurality of control states that correspond to distinct display scanning frequencies of television standards, respectively. By setting the control component in a selected control state so that the frequency of the source control signal outputted by the pulse-width-modulation controller is not an integer multiple of the distinct display scanning frequency that corresponds to the selected control state, the problem due to mura phenomenon will be prevented effectively.

According to another aspect of the present invention, there is provided a back lighting source module capable of preventing harmonic interference in a television. The television receives a television image signal having a display scanning frequency, and presents an image corresponding to the television image signal. The back lighting source module comprises a light source, a pulse-width-modulation controller, and a control component.

The pulse-width-modulation controller is coupled electrically to the light source, and is operable so as to generate a source control signal for controlling turning on and turning off of the light source.

The control component is coupled to the pulse-width-modulation controller for controlling frequency of the source control signal outputted by the pulse-width-modulation controller. Moreover, the control component has a plurality of control states that correspond to distinct display scanning frequencies of television standards, respectively. By setting the control component in a selected control state so that the frequency of the source control signal outputted by the pulse-width-modulation controller is not an integer multiple of the distinct display scanning frequency that corresponds to the selected control state, the problem due to mura phenomenon will be prevented effectively.

According to yet another aspect of the present invention, there is provided a light source control unit adapted for controlling turning on and turning off of a light source in a television. The television receives a television image signal having a display scanning frequency, and presents an image corresponding to the television image signal. The light source control unit comprises a pulse-width-modulation controller and a switch.

The pulse-width-modulation controller is adapted to be coupled electrically to the light source, and is operable so as to generate a source control signal for controlling turning on and turning off of the light source. The pulse-width-modulation controller is configured with two preset frequency ranges that correspond to two distinct display scanning frequencies, respectively. Each of the preset frequency ranges excludes integer multiples of the corresponding distinct display scanning frequency.

The switch is coupled electrically to the pulse-width-modulation controller, and has a first control state and a second control state that correspond to the two preset frequency ranges, respectively.

Setting of the switch in a selected one of the first and second control states results in control of the pulse-width-modulation controller such that frequency of the source control signal outputted by the pulse-width-modulation controller falls within the preset frequency range that corresponds to the selected one of the first and second control states.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

At present, there are three primary television standards in the world: the National Television System Committee (NTSC) standard used in the United States and Taiwan; the Phase Alternation Line (PAL) standard used in Western Europe; and the Sequental Couleur A Memoire (SECAM) standard used in Russia and Eastern Europe. The three television standards have a common horizontal display scanning frequency of 15.75 KHz for television image signals. However, the vertical display scanning frequency of television image signals in the NTSC standard is 60 Hz, whereas that in the PAL and SECAM standards is 50 Hz. Since harmonic interference can be attributed to the vertical display scanning signals, this invention proposes the use of a control component to inform a light source control unit of the vertical display scanning frequency of a current input image signal. The light source control unit is thus controlled such that frequency of a source control signal for controlling turning on and turning off of a light source and outputted by the light source control unit is not an integer multiple of the vertical display scanning frequency of the current input image signal.

Figure 1:
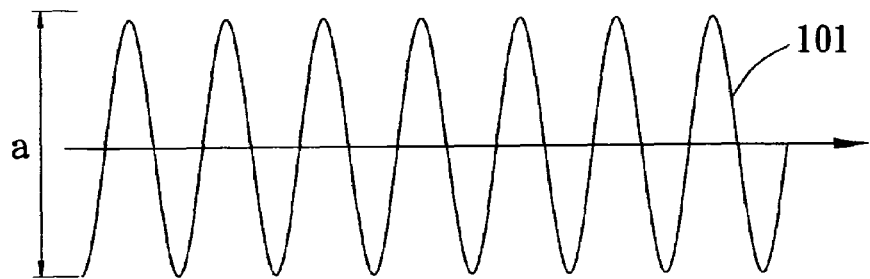
FIG. 1 illustrates a power signal for adjusting brightness and contrast in a conventional LCD television.
Figure 2:
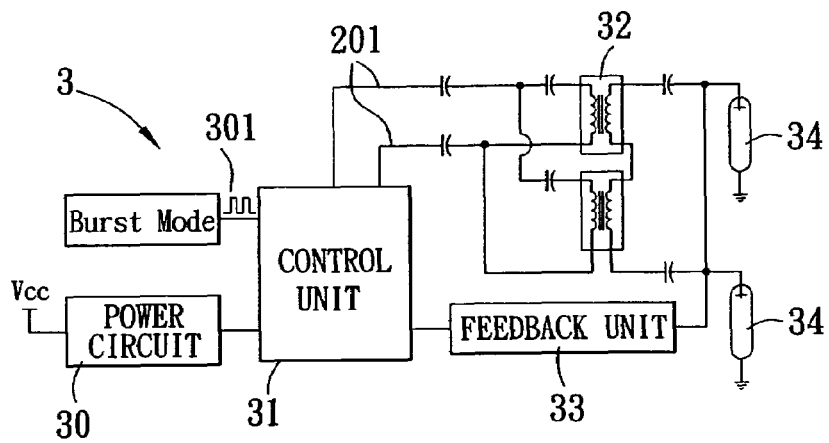
FIG. 2 is a schematic circuit block diagram of a conventional LCD television that is operable in a burst mode.
Figure 3:
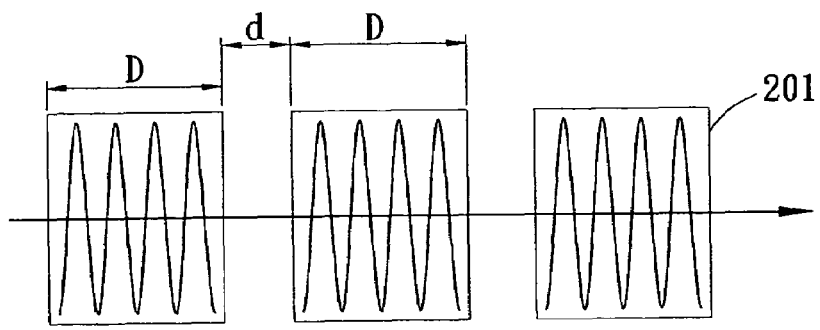
FIG. 3 illustrates a source control signal generated in the conventional LCD television of FIG. 2.
Figure 4:
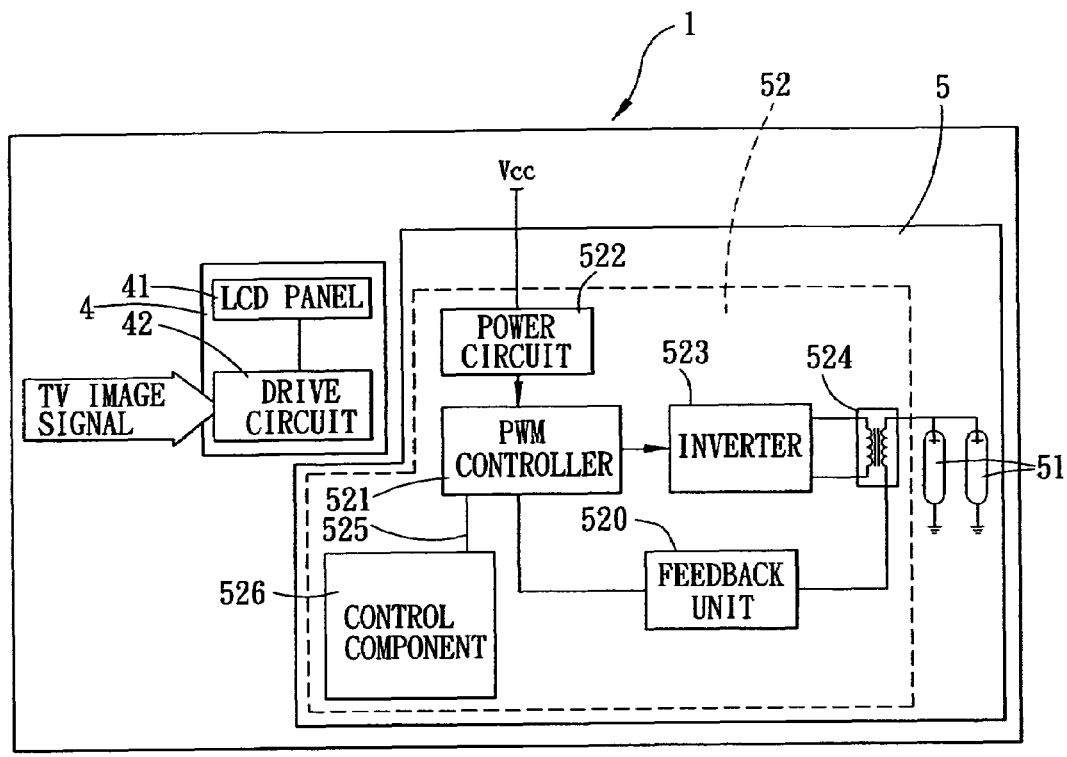
FIG. 4 is a schematic circuit block diagram of the preferred embodiment of a television capable of preventing harmonic interference according to the present invention.

Referring to FIG. 4, the preferred embodiment of a television 1 according to the present invention is shown to comprise a liquid crystal module 4 and a back lighting source module 5. The liquid crystal module 4 includes a liquid crystal display (LCD) panel 41 and a drive circuit 42 for driving the LCD panel 41 according to inputted television image signals. The back lighting source module 5 includes a light source 51 and a light source control unit 52 for controlling turning on and turning off of the light source 51. The back lighting source module 5 further includes other components, such as prisms, diffusion films, light-guiding plates, etc. Since these components are known to those skilled in the art and are not relevant to the present invention, they will not be described in detail hereinafter for the sake of brevity.

In this embodiment, the light source 51 includes a plurality of cold-cathode lamps to be turned on and off by the light source control unit 52 so as to generate light required by the liquid crystal module 4. The number of cold-cathode lamps needed for the light source 51 depends on the dimensions of the LCD panel 41. Moreover, it can be appreciated by those skilled in the art that the light source 51 can include other light-generating components, such as light-emitting diodes, to replace the aforesaid cold-cathode lamps.

The light source control unit 52 includes a power circuit 522, a pulse-width-modulation (PWM) controller 521 coupled electrically to the power circuit 522, an inverter 523 coupled to the PWM controller 521, a transformer 524 coupled to the inverter 523 and the light source 51, and a feedback unit 520 coupled to the transformer 524 and the PWM controller 521. The PWM controller 521 is operable in a burst mode so as to permit a wide range of adjustable brightness values for the light source 51. When operated in the burst mode, the PWM controller 521 generates a source control signal for controlling turning on and turning off of the light source 51. Since the structures and operations of the inverter 523, the transformer 524 and the feedback unit 520 are well known to those skilled in the art, they will not be described in detail hereinafter for the sake of brevity.

The PWM controller 521 has a control terminal 525. In this preferred embodiment, the light source control unit 52 further includes a control component 526 coupled to the control terminal 525 of the PWM controller 521 for controlling frequency of the source control signal outputted by the PWM controller 521. The control component 526 has a plurality of control states that correspond to distinct display scanning frequencies of television standards, respectively. The PWM controller 521 is configured with a plurality of preset frequency ranges, each of which corresponds to a respective one of the control states of the control component 526, and each of which excludes integer multiples of the distinct display scanning frequency that corresponds to the respective one of the control states. Accordingly, when the control component 526 is set in a selected one of the control states, the PWM controller 521 is controlled such that the frequency of the source control signal outputted thereby falls within the preset frequency range that corresponds to the selected one of the control states for controlling brightness of the light source 51. Since the frequency of the source control signal is not an integer multiple of the distinct display scanning frequency that corresponds to the selected one of the control states of the control component 526, the effect of preventing harmonic interference is thus achieved.

Figure 5:
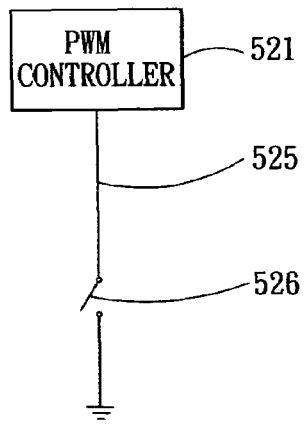
FIG. 5 is a schematic circuit diagram illustrating a pulse-width-modulation controller and a switch of the preferred embodiment.

As mentioned hereinbefore, the vertical display scanning frequency of a television image signal may be 50 Hz or 60 Hz depending on the television standard. Moreover, manufacturers usually know beforehand where a television product is most likely to be sold. Therefore, referring to FIG. 5, in this preferred embodiment, the control component 526 is a user-controlled switch. One terminal of the control component 526 is coupled electrically to the control terminal 525 of the PWM controller 521, whereas the other terminal of the control component 526 is grounded. The state of the control terminal 525 of the PWM controller 521 thus depends on whether the control component 526 is switched on or switched off. In this preferred embodiment, the ON control state of the control component 526 corresponds to the 60-Hz vertical display scanning frequency, which complies with the NTSC standard, whereas the OFF control state of the control component 526 corresponds to the 50-Hz vertical display scanning frequency, which complies with the PAL and SECAM standards. The control component 526 of the preferred embodiment is preferably mounted on a surface of the television 1 so as to be easily accessed by a manufacturer, a vendor or a user, and so that the control state of the control component 526 can be selected according to the desired television standard. For instance, when using the television 1 in the U.S., the control component 526 is set in the ON control state, and when using the television 1 in Europe, the control component 526 is set in the OFF control state.

In practice, for example, if the control component 526 is set in the ON control state corresponding to the display scanning frequency of 60 Hz, the control terminal 525 of the PWM controller 521 is grounded, thereby controlling the PWM controller 521 such that the source control signal outputted thereby falls within a preset frequency range (for instance, 215-225 Hz), which excludes integer multiples of the 60-Hz display scanning frequency. On the other hand, if the control component 526 is set in the OFF control state corresponding to the display scanning frequency of 50 Hz, the control terminal 525 of the PWM controller 521 is not grounded, thereby controlling the PWM controller 521 such that the source control signal outputted thereby falls with another preset frequency range (for instance, 220-230 Hz), which excludes integer multiples of the 50-Hz display scanning frequency.

Therefore, by setting the control component 526 in a selected one of the control states, the state of the control terminal 525 of the PWM controller 521 can be varied to control the PWM controller 521 such that the frequency of the source control signal outputted thereby falls within the preset frequency range that corresponds to the selected one of the control states.

It should be noted herein that while the control component 526 is implemented using a user-controlled switch in this preferred embodiment, it should be apparent to those skilled in the art that the control component may be implemented using a detector for detecting the display scanning frequency of an input television image signal automatically, and a switch whose control state is controlled by the detector according to the detected display scanning frequency. Therefore, implementation of the control component should not be limited to the disclosed embodiment.

In sum, a wider range of adjustable brightness and contrast values for an LCD TV is achieved in the present invention as compared to conventional signal amplitude adjustment techniques by virtue of operation in the burst mode when controlling light source activation. Moreover, through the control component 526 of this invention, harmonic interference can be prevented so as to overcome the mura phenomena commonly experienced in the prior art. Therefore, this invention can significantly improve the quality of television image presentation.

Moreover, it can be appreciated by those skilled in the art that the light source control unit 52 of this invention can be applied to other display devices, such as back-projection televisions and LCD projector devices, which are capable of presenting television image signals and which require light source adjustment.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A television adapted for receiving a television image signal having a display scanning frequency and for presenting an image corresponding to the television image signal, said television comprising:
   a light source;
   a pulse-width-modulation controller coupled electrically to said light source, and operable so as to generate a source control signal for controlling turning on and turning off of said light source; and
   a control component coupled to said pulse-width-modulation controller for controlling frequency of the source control signal outputted by said pulse-width-modulation controller;
   wherein said control component has a plurality of control states that correspond to distinct display scanning frequencies of television standards, respectively;
   wherein setting of said control component in a selected one of said control states results in control of the frequency of the source control signal outputted by said pulse-width-modulation controller such that the frequency of the source control signal is not an integer multiple of the distinct display scanning frequency that corresponds to the selected one of said control states;
   wherein said pulse-width-modulation controller is configured with a plurality of preset frequency ranges, each said range corresponds to a respective one of said control states of said control component, and each said range excludes integer multiples of the distinct display scanning frequency that corresponds to the respective one of said control states;
   wherein, when said control component is set in the selected one of said control states, said pulse-width-modulation controller is controlled such that the frequency of the source control signal outputted thereby falls within the preset frequency range that corresponds to the selected one of said control states.

2. The television as claimed in claim 1, wherein said pulse-width-modulation controller is operated in a burst mode.

3. The television as claimed in claim 1, wherein said control component is a user-controlled switch.

4. The television as claimed in claim 1, wherein one of said control states of said control component corresponds to a television standard having a 50-Hz display scanning frequency.

5. The television as claimed in claim 4, wherein another one of said control states of said control component corresponds to a television standard having a 60-Hz display scanning frequency.

6. The television as claimed in claim 1, wherein said television is a liquid crystal television, and said light source includes a lamp tube.

7. A back lighting source module capable of preventing harmonic interference in a television, the television receiving a television image signal having a display scanning frequency, and presenting an image corresponding to the television image signal, said back lighting source module comprising:

a light source;

a pulse-width-modulation controller coupled electrically to said light source, and operable so as to generate a source control signal for controlling turning on and turning off of said light source; and a control component coupled to said pulse-width-modulation controller for controlling frequency of the source control signal outputted by said pulse-width-modulation controller;

wherein said control component has a plurality of control states that correspond to distinct display scanning frequencies of television standards, respectively;

wherein setting of said control component in a selected one of said control states results in control of the frequency of the source control signal outputted by said pulse-width-modulation controller such that the frequency of the source control signal is not an integer multiple of the distinct display scanning frequency that corresponds to the selected one of said control states;

wherein said pulse-width-modulation controller is configured with a plurality of preset frequency ranges, each said range corresponds to a respective one of said control states of said control component, and each said range excludes integer multiples of the distinct display scanning frequency that corresponds to the respective one of said control states;

wherein, when said control component is set in the selected one of said control states, said pulse-width-modulation controller is controlled such that the frequency of the source control signal outputted thereby falls within the preset frequency range that corresponds to the selected one of said control states.

8. The back lighting source module as claimed in claim 7, wherein said pulse-width-modulation controller is operated in a burst mode.

9. The back lighting source module as claimed in claim 7, wherein said control component is a user-controlled switch.

10. The back lighting source module as claimed in claim 7, wherein one of said control states of said control component corresponds to a television standard having a 50-Hz display scanning frequency.

11. The back lighting source module as claimed in claim 10, wherein another one of said control states of said control component corresponds to a television standard having a 60-Hz display scanning frequency.

* * * * *